United States Patent [19]
Monet et al.

[11] Patent Number: 5,912,545
[45] Date of Patent: Jun. 15, 1999

[54] SYSTEM AND METHODS USING A MOTOR DRIVE CIRCUIT TO BOTH DRIVE A BATTERY OPERATED MOTOR AND TO RECHARGE THE BATTERY

[75] Inventors: Paul L. Monet, Brookfield; Thomas E. Villiesse, Waukesha, both of Wis.

[73] Assignee: Ortho-Kinetics Inc., Waukesha, Wis.

[21] Appl. No.: 08/854,467

[22] Filed: May 12, 1997

[51] Int. Cl.$^6$ .............. H02J 7/10; H02M 7/519; H02P 1/00
[52] U.S. Cl. .............. 320/107; 320/114; 320/139; 363/132; 318/139
[58] Field of Search .................. 320/104, 107, 320/139, 140, 141, 142, 143, 114; 363/98, 132; 323/222; 318/139, 376, 377, 378

[56] References Cited

U.S. PATENT DOCUMENTS

| | | | |
|---|---|---|---|
| 3,820,000 | 6/1974 | Smith | 320/107 |
| 3,970,912 | 7/1976 | Hoffman | 320/114 |
| 4,953,068 | 8/1990 | Henze | 363/17 |
| 5,504,414 | 4/1996 | Kinoshita | 180/65.8 |
| 5,734,237 | 3/1998 | Engel | 318/139 |

Primary Examiner—Peter S. Wong
Assistant Examiner—Gregory J. Toatley, Jr.
Attorney, Agent, or Firm—Ryan Kromholz & Manion

[57] ABSTRACT

A battery-operated motor system includes a rechargeable battery, a motor and circuitry for recharging the battery. The recharging circuit processes externally applied energy to provide a source of recharging current. The recharging current is applied to a winding in the motor in the form of periodic current pulses. Following each pulse, energy thus stored in the motor winding is allowed to discharge into the battery, thereby recharging it. Use of the motor winding in this manner avoids the need to provide a separate inductance for recharging the battery and results in reduced weight, fewer components and greater manufacturing economy. The large inductance of the motor winding also enables recharging at a rate well suited to the particular motor/battery combination. By using existing components of a known H bridge motor drive to perform the various switching functions, further savings in these areas can be realized.

48 Claims, 4 Drawing Sheets

SYSTEM AND METHODS USING A MOTOR DRIVE CIRCUIT TO BOTH DRIVE A BATTERY OPERATED MOTOR AND TO RECHARGE THE BATTERY

BACKGROUND OF THE INVENTION

This invention relates generally to systems and methods of recharging batteries and, more particularly, to systems and methods of recharging batteries used to power motors. More particularly still, the invention provides a system and method that is particularly well suited for recharging the battery of a battery-powered, personal mobility cart having a motor and an "H-bridge" motor drive.

Electrical batteries are widely used to power a variety of electrical devices. Battery operation provides tremendous versatility, mobility and freedom by eliminating the need to connect a device with an external source of electrical energy. However, no battery can supply energy indefinitely. The need to recharge or replace spent batteries remains a cost of battery operation.

Advances in the battery art have improved the capacity, reliability and life of rechargeable batteries. Battery-powered devices using such batteries typically include a recharging circuit. When the battery-powered device is not in use, the recharging circuit takes energy from an external source, such as 120 VAC, 60 Hz. line currents and applies it to the battery to recharge it. This requires that the recharging circuit be connected with the external source and that the recharging circuit convert the external power to a form suitable for recharging the battery.

Advances in the battery art have made it practical to use rechargeable batteries in electric vehicles of various types. Common types of vehicles using battery-operated motor systems include small, short range, open vehicles such as golf carts, scooters for the elderly and disabled, and motorized wheelchairs. Other forms of battery-operated, motor-driven devices include cordless tools, appliances etc. In these devices, a large capacity battery supplies electrical power to a motor that, in turns drives the vehicle or device. Motor operation is controlled by a control circuit that can range in complexity and sophistication from a simple mechanical switch to a programmable, microprocessor-based system. Typically, a motor drive circuit under the command of the control circuit is provided for controlling the magnitude and direction of electrical current passing from the battery through the motor. One common form of motor drive is the "H-bridge" drive that includes four electronic switches that are arranged in an "H" configuration and are operable to direct variable width current pulses in either direction through the motor.

Electric vehicles typically perform considerable work and, thus, require considerable energy for battery recharging. In such vehicles, battery recharging is typically accomplished with a dedicated charging system powered by standard line current. Such battery chargers typically include a converter that rectifies and filters the AC source voltage and further include an inductor coupled to the converter through an electronic switch and to the battery through a diode. The electronic switch (typically a transistor) operates under the control of a control circuit to switch pulse-width modulated pulses of the rectified and filtered current to the inductor When the switch is "ON," energy is delivered to and stored in the field of the inductor. When the switch is "OFF," the energy stored in the coil is available for discharge from the coil. The diode is connected and polarized so that the battery is electrically isolated from the coil as the coil is charged and is electrically coupled to the coil as the coil discharges. Accordingly, energy introduced into the coil from the converter when the electronic switch is "ON" discharges into the battery when the electronic switch is "OFF." Such a charging system is known in the industry as a "buck" regulator.

The rate at which such a "buck" regulator can recharge a battery is largely dependent on the size of the inductor. Larger inductors can store more energy and, hence, deliver greater charging power to the battery than smaller inductors Larger inductors however, are physically larger, heavier and more expensive than smaller inductors Because inductors are typically the largest, heaviest and most expensive single component of a battery charging system, the desire for rapid charging is often tempered with the need to keep the size, weight and cost of the recharging system within reasonable limits.

SUMMARY OF THE INVENTION

The invention provides a charging system for recharging a battery used to power a motor having a winding The charging system includes an input for receiving externally supplied electrical energy, and further includes circuitry coupled to the input, the winding and the battery that is operable to alternately couple the winding with the input and with the battery so that externally supplied electrical energy is alternately transferred from the input into the winding and then from the winding into the battery.

The invention also provides a charging system for recharging a battery used to power a motor having a winding. The charging system includes an input for receiving externally supplied electrical energy, a first switch operable to connect the winding with the input to introduce electrical energy into the winding, a second switch operable to connect the winding with the battery to discharge the stored energy into the battery, and a control circuit operable to actuate the first and second switches to alternately introduce electrical energy into the winding and discharge electrical energy from the winding into the battery.

The invention also provides a rechargeable battery-powered motor system including a rechargeable battery, a motor having a winding, a motor drive circuit operable to apply electrical energy from the battery to the motor and an input circuit operable to receive charging current from an external source. The motor system further includes a first electronic switch operable to electrically connect and disconnect the input circuit with the winding of the motor and a second electronic switch operable to disconnect the winding of the motor from the battery when the first electronic switch connects the input circuit with the winding, and to connect the winding with the battery when the first electronic switch disconnects the input circuit from the winding so that energy introduced into the winding from the external source when the winding is connected with the input circuit is discharged into the battery when the winding is disconnected from the input circuit.

The invention also provides a method of charging a battery in a battery-powered, motorized system having a battery, a motor including a winding, and a drive circuit for controllably applying power from the battery to the motor. The method comprises the steps of providing a source of charging currents switching the winding of the motor into electrical communication with the source of charging current to introduce energy into the winding, and thereafter switching the winding into electrical communication with the battery to discharge energy from the winding into the battery.

It is an object of the invention to provide a new and improved system and method of recharging batteries.

It is a further object of the invention to provide a new and improved system and method of recharging batteries used to power motors.

It is a further object of the invention to provide a new and improved system and method of charging batteries that avoids the use of large, heavy and expensive inductors.

It is a further object of the invention to provide a new and improved system and method of charging batteries that makes use of existing circuit components and parts.

It is a further object of the invention to provide a new and improved system and method of charging batteries in a battery-powered motor system wherein an "H-bridge" motor drive is used to direct electrical current to the motor.

BRIEF DESCRIPTION OF THE DRAWINGS

The features of the present invention which are believed to be novel are set forth with particularity in the appended claims. The inventions together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
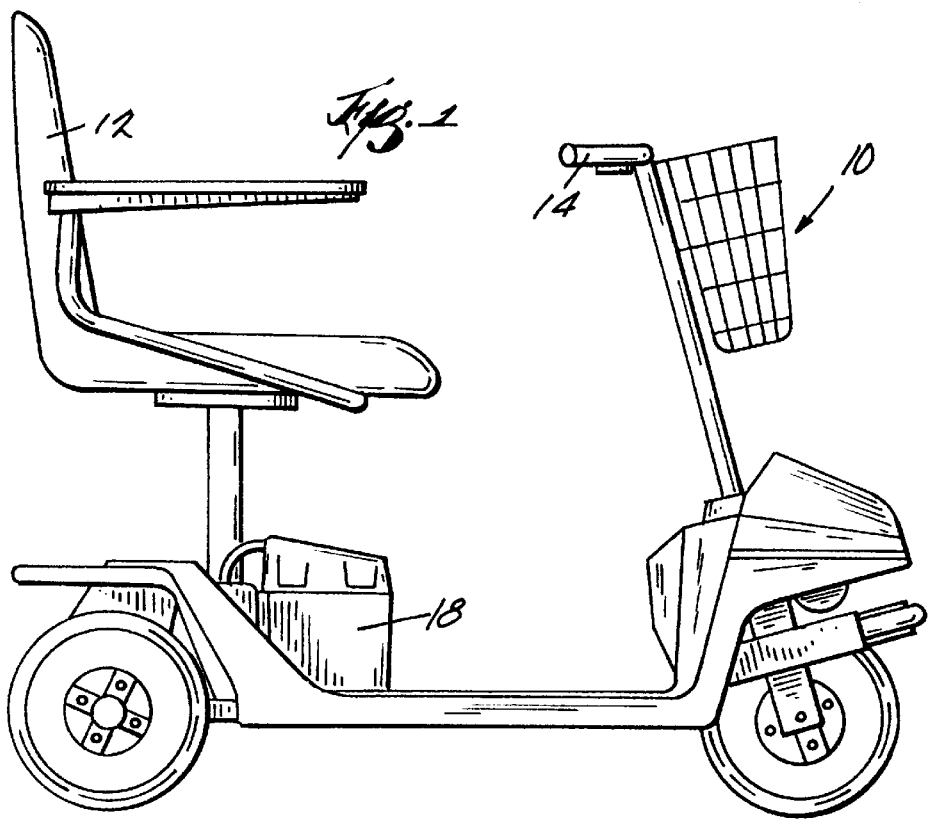
FIG. 1 is a perspective view of a battery-powered electric vehicle having a rechargeable, battery-operated motor drive and a battery charger embodying various features of the invention.
Figure 2:
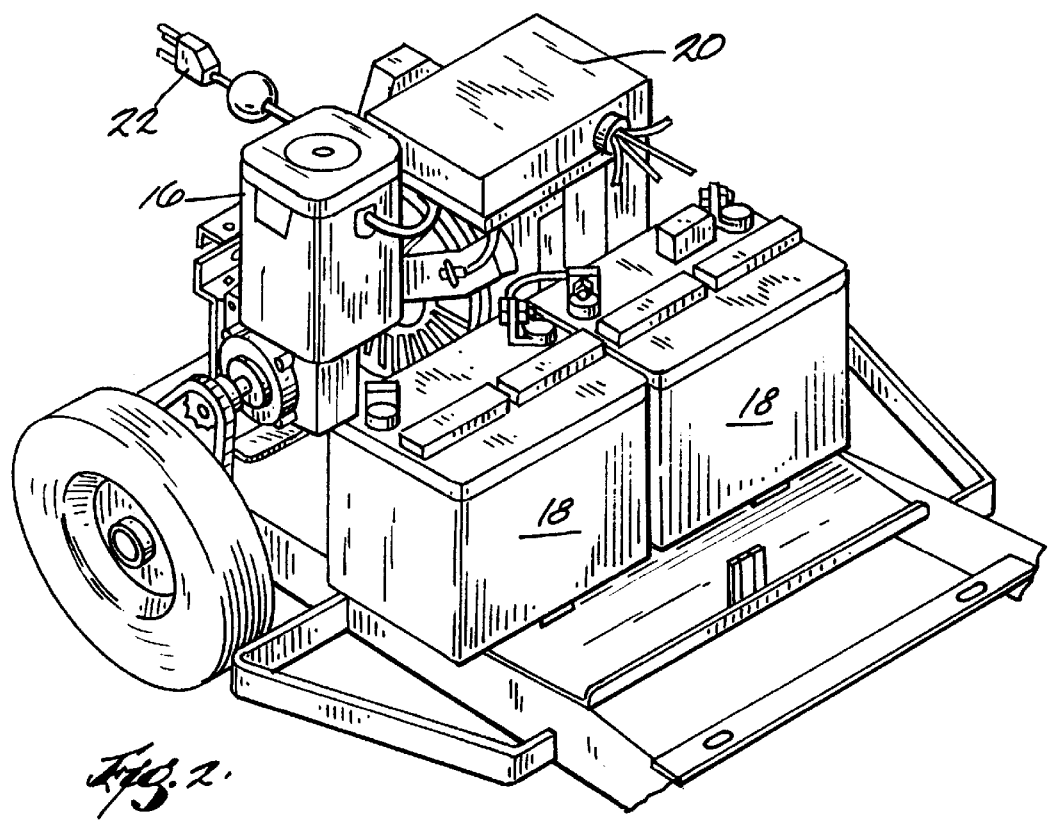
FIG. 2 is a fragmentary perspective view of a typical battery-operated motor drive.

Referring to the drawings, and in particular to FIGS. 1 and 2, a battery-operated, motorized device is illustrated, for exemplary purposes, in the form of a personal mobility device or scooter 10. It will be understood that the invention in its broader aspects, is not limited to use only in scooters or other such vehicles and devices. In its broader aspects, the invention can be used in any battery powered system wherein a device having substantial inductance such as a motor, solenoid, coil or winding, is present.

As illustrated in FIGS. 1 and 2, the scooter 10 comprises a three or four wheeled vehicle having a seat 12 for the operator and a handle bar 14 for steering. An electric motor 16 coupled to the rear wheels of the scooter propels the vehicle forward and back, while a rechargeable battery 18 provides electrical power for operating the motor 16. Alternatively, front wheel drive can be used. A throttle in the form of a finger switch on the handle bar 14 or a foot pedal controls vehicle speed. Additional switches or operator inputs control vehicle direction and such other functions as warning lights, horns, brakes etc.

These various control inputs are applied to an electronic control module 20 that controls the overall operation of the vehicle 10.

Electrical energy for recharging the battery 18 is supplied to the vehicle 10 from an external source. In the illustrated embodiment, energy for recharging the battery 18 is obtained from standard 120 VAC, 60 Hz. supply mains and is supplied to the vehicle 10 through a power cord 22. It will be appreciated that other sources of recharging energy, such as 220 VAC, 440 VAC etc., as well as direct current sources, can also be used. Circuitry partially within the control module 20 processes the charging energy in accordance with various aspects of the invention and applies the processed energy to the battery 18 for recharging When battery recharging is desired the power cord 22 is plugged into a standard 120 VAC wall outlet. After recharging, the cord 22 is unplugged and the vehicle 10 is driven away.

In accordance with one aspect of the invention, a new and improved system and method are provided for recharging the battery 18. The system and method result in fewer parts, lighter weight and greater economy than when prior systems and methods are used. The construction and operation of the system and method of the present invention can best be understood through a review of the systems shown in FIGS. 3, 4 and 5.

Figure 3:
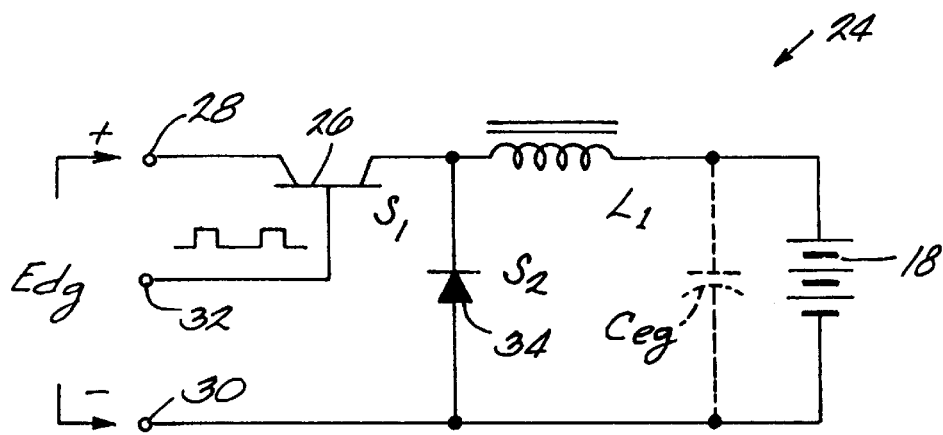
FIG. 3 is a simplified schematic diagram of a "buck" regulator charging system useful in understanding the operation thereof.

FIG. 3 shows one common form of charging circuit 24 commonly known as a "buck" regulator. The "buck" regulator circuit 24 includes an inductor $L_1$ having one end electrically coupled to one terminal (e.g., positive) of the battery 18 and another end connected to a principal terminal of a switch $S_1$. In the illustrated embodiment, the switch $S_1$ takes the form of an electronic switch such as a transistor 26. The other principal terminal of the switch $S_1$ is coupled to a first input 28. The other terminal (i.e., negative) of the battery 18 is coupled to a second input 30, and the control input of the switch $S_1$ is coupled to a control input 32. A second switch $S_2$ is connected between the negative terminal of the battery 18 and the juncture of the inductor $L_1$ and the first switch $S_1$. In the illustrated embodiment, the second switch $S_2$ takes the form of a semiconductor diode 34. The diode is connected so that it is ordinarily reverse biased by the potential of the battery 18.

When the battery 18 is to be recharged, the line cord 22 (FIG. 2) is plugged into a wall outlet. Energy received through the line cord 22 (FIG. 2) is first rectified and filtered in known manner to develop a charging voltage $E_{cg}$ that is applied to the inputs 28 and 30 of the "buck" regulator circuit 24. A control signal developed by appropriate circuitry in the control module 20 is applied to the control input 32 to control actuation of the switch $S_1$. In the illustrated embodiment, the control signal takes the form of a square or rectangular pulse of variable duration. Application of the control signal has the effect of periodically turning the switch $S_1$ ON or OFF.

When the switch $S_1$ is ON, the charging voltage $E_{cg}$ is applied to the inductor $L_1$. This has the affect of loading or storing energy into the inductor $L_1$. The amount of energy thus stored in the inductor $L_1$ is a function, in part, of the charging voltage $E_{cg}$ and the duration of each control pulse applied to the control input 32. The second switch $S_2$ (diode 34) remains OFF (i.e., reverse biased) during this time.

When the switch $S_1$ is switched OFF, the voltage across the inductor $L_1$ reverses, thereby forward biasing the diode 34 and turning the second switch $S_2$ ON. Energy previously loaded into and stored in the inductor $L_1$ is thus allowed to discharge into the battery 18.

By appropriately controlling the duty cycle of the control signal applied to the first switch $S_1$, the charging rate of the battery 18 can be controlled.

Figure 4:
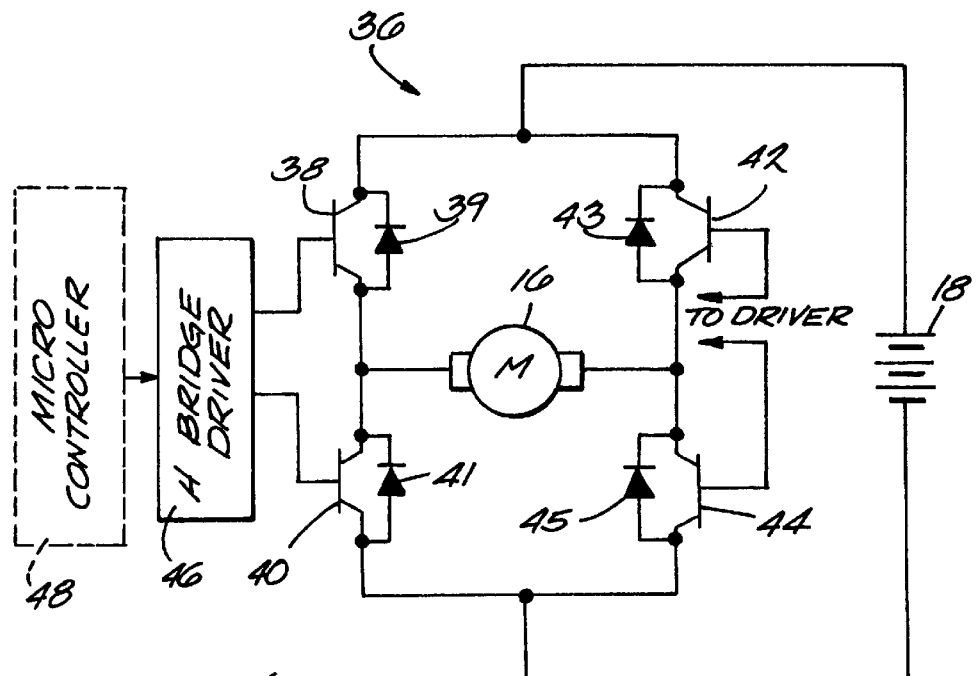
FIG. 4 is a simplified schematic diagram of an "H bridge" drive system operable to power and control a battery operated motor such as one included in the vehicles shown in FIGS. 1 and 2.

FIG. 4 shows a motor drive system 36 commonly known as an "H bridge." The H bridge drive system 36 includes four power switching devices such as transistors 38, 40, 42 and 44. Pairs of the transistors 38, 40 and 42, 44 are series connected, and the series connected pairs 38, 40 and 42, 44 are connected in parallel across the battery 18. The motor 16 is connected across the junctures between transistors 38, 40 and 42, 44 to form the "H" configuration shown. Each transistor 38, 40, 42, 44 is shunted by a normally reverse biased diode 39, 41, 43, 45 that can be a discrete component or a parasitic component or characteristic of the particular transistor used. The control input of each power switching device 38, 40, 42, 44 is coupled to an H bridge driver 46 that turns each device ON or OFF as needed to achieve a desired motor effect. By controlling which devices are turned ON and for how long, both the direction and average magnitude of current through the motor 16 can be controlled by electronic means. This increases system operating flexibility and efficiency and avoids the difficulties and deficiencies associated with mechanical, high current switching devices. In the illustrated embodiment, a microprocessor-based control circuit 48 included in the control module 20 (FIG. 2) controls operation of the H bridge driver 46 and, ultimately, the motor 16.

It will be appreciated that, in practice, a variety of electronic power switching devices, such as power FETs, can be used in the H bridge and that the particular transistors shown are meant to be exemplary rather than limiting. It will also be appreciated that other types of motor drive circuits, such as those using mechanical switches, relays, half-bridge circuit architectures, etc., can also be used in place of the H bridge 36 shown and that the invention in its broader aspects is not limited to use with H bridge circuits.

Figure 5:
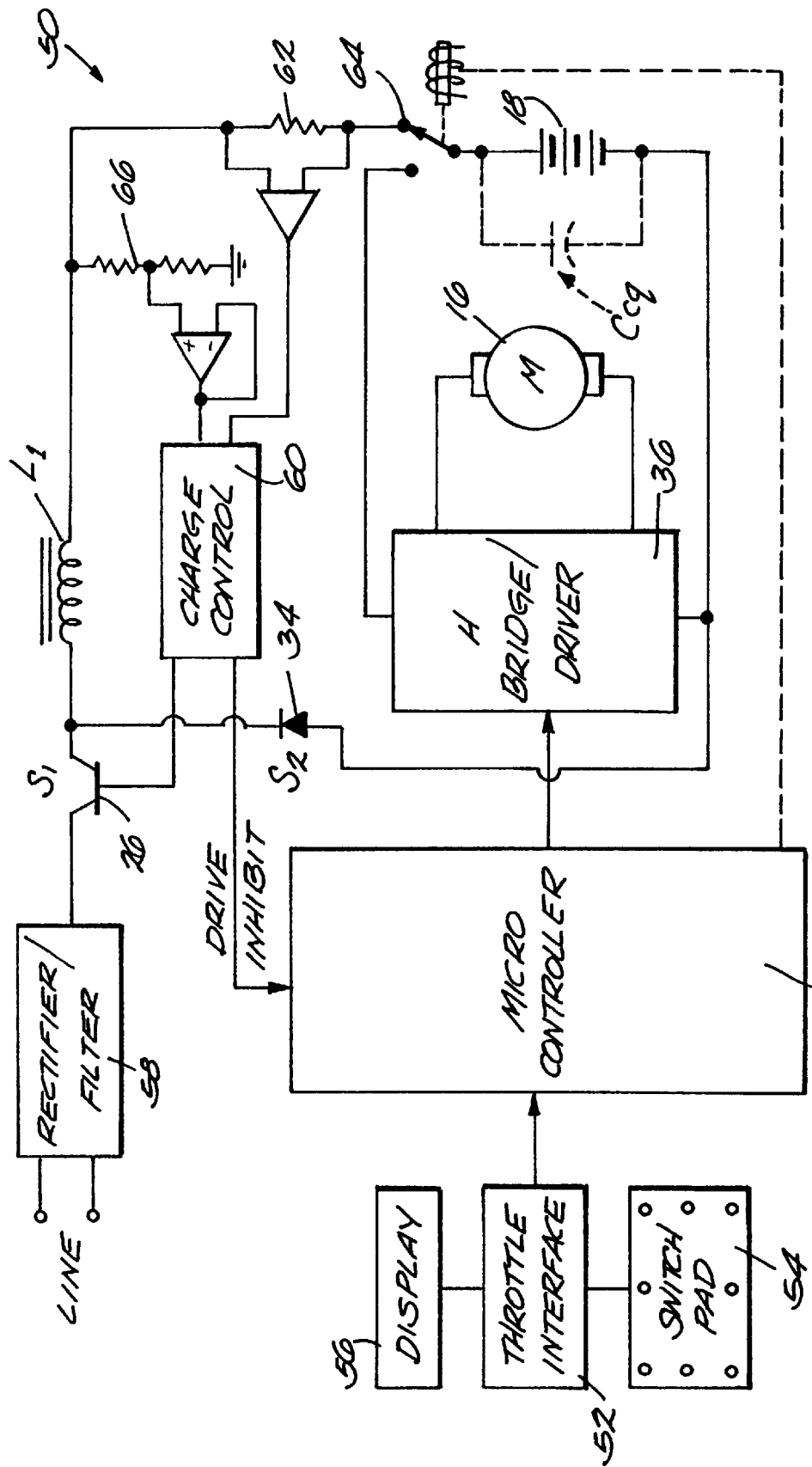
FIG. 5 is a simplified block diagram of a prior art rechargeable, battery-operated motor drive having separate charging and driving systems

A typical prior rechargeable, battery-operated, motor system 50 is shown in FIG. 5. As illustrated, the system 50 includes the microprocessor-based controller 48 that receives various operator control inputs from a throttle interface 52 and switch pad 54 and that provides operating information back to the operator via a display 56. The micro controller 48 is coupled to the H bridge/driver circuit 36 which is coupled to both the battery 18 and the motor 16. Control inputs received from the throttle interface 52 and the switch pad 54 are processed by the micro controller 48, and appropriate motor drive control signals generated by the micro controller 48 in response to the control inputs are applied to the H bridge/driver 36. The H bridge/driver 36, in turn, applies current pulses to the motor 16 to operate the motor at the speed and in the direction desired by the operator.

To recharge the battery 18, the motor system 50 includes a recharging circuit that operates on the "buck" regulator principle. AC line current is converted to DC by a rectifier and filter circuit 58. The rectified and filtered DC charging current is coupled to one and of the inductor L1 through the first electronic switch $S_1$ (transistor 26) which operates under the control of a charge control circuit 60. The other and of the inductor L1 is coupled to one (positive) side of the battery 18 through a current sensing resistor 62 and one side of a relay 64 or other power switching device. Other known forms of current sensors can be used and can be placed in other locations, such as, for example, on the other (negative) side of the battery 18. The other (negative) side of the battery 18 is coupled to the juncture of the inductor L1 and first switch $S_1$ through the second switch $S_2$, which, in the illustrated embodiment, comprises the normally reverse biased diode 34. The relay 64 operates under the command of the micro controller 48 and functions to connect the positive side of the battery 18 with either the H bridge/driver 36 or the output of the recharging circuit.

To recharge the battery 18, the micro controller 48 switches the relay 64 to connect the battery 18 with the output of the recharging circuit. The charge control circuit 60 applies a series of rectangular pulses to the control input (base) of the first switch $S_1$ (transistor 26) which has the effect of applying current pulses from the rectifier/filter 58 to the inductor L1. This has the effect of "charging" the inductor L1 in the manner previously described. When the switch $S_1$ is switched OFF, the second switch $S_2$ (diode 34) switches ON (i.e., becomes forward biased) allowing the inductor L1 to discharge into, and thus recharge, the battery 18. The charging current delivered to the battery 18 is sensed by monitoring the voltage developed across the current sensing resistor 62. The battery voltage during recharging is sensed using any of a number of techniques, such as the voltage divider/buffer amplifier arrangement 66 shown. Signals indicative of both the battery voltage and battery charge current are fed back to the charge control circuit 60, which uses the information to change the duty cycle of the control signals applied to the first switch $S_1$ and thereby change the charging current delivered to the battery 18. A number of known charging algorithms can be used to tailor the charging protocol to the requirements of the particular battery 18 employed. Preferably, the charge control circuit 60 provides a "drive inhibit" control command to the micro controller 48 to inhibit motor and/or device operation during the recharging cycle, although this is not necessary for proper operation of the recharging system.

The system and method of the present invention are based in part on recognition that significant simplicity, weight savings and manufacturing economy can result by using existing system components in place of separate, dedicated components used in prior systems. In particular, the system and method of the present invention are based in part on the use of the inherent inductance of the motor in place of a separate inductor L1 as in prior systems. Use of a motor winding as the primary inductor in the recharging circuit has many advantages. In the first place, the motor winding is already present in the system and in this sense is obtained "for free." No separate recharging inductor need be provided. Additionally, the motor winding, which is already designed and built to handle substantial power, is ideally suited for use as a recharging inductor. In recharging systems of the "buck" regulator type, the recharging power delivered by the recharging system to the battery is largely dependent on the inductance and current carrying capacity of the recharging inductor. Accordingly, to achieve high recharging currents and quick recharging rates, large, heavy and expensive inductors are required. Because the invention uses the inherent inductance of the motor for recharging purposes, these factors are of lesser concern than when a separate, dedicated recharging inductor is used. Furthermore, because the same inductor (i.e., the motor winding) is used as both the load (during device operation) and as the recharging inductor (during battery recharging), the motor winding is likely to have the ideal inductance for recharging the battery assuming the battery and motor are well matched from a load/battery-capacity standpoint.

Figure 6:
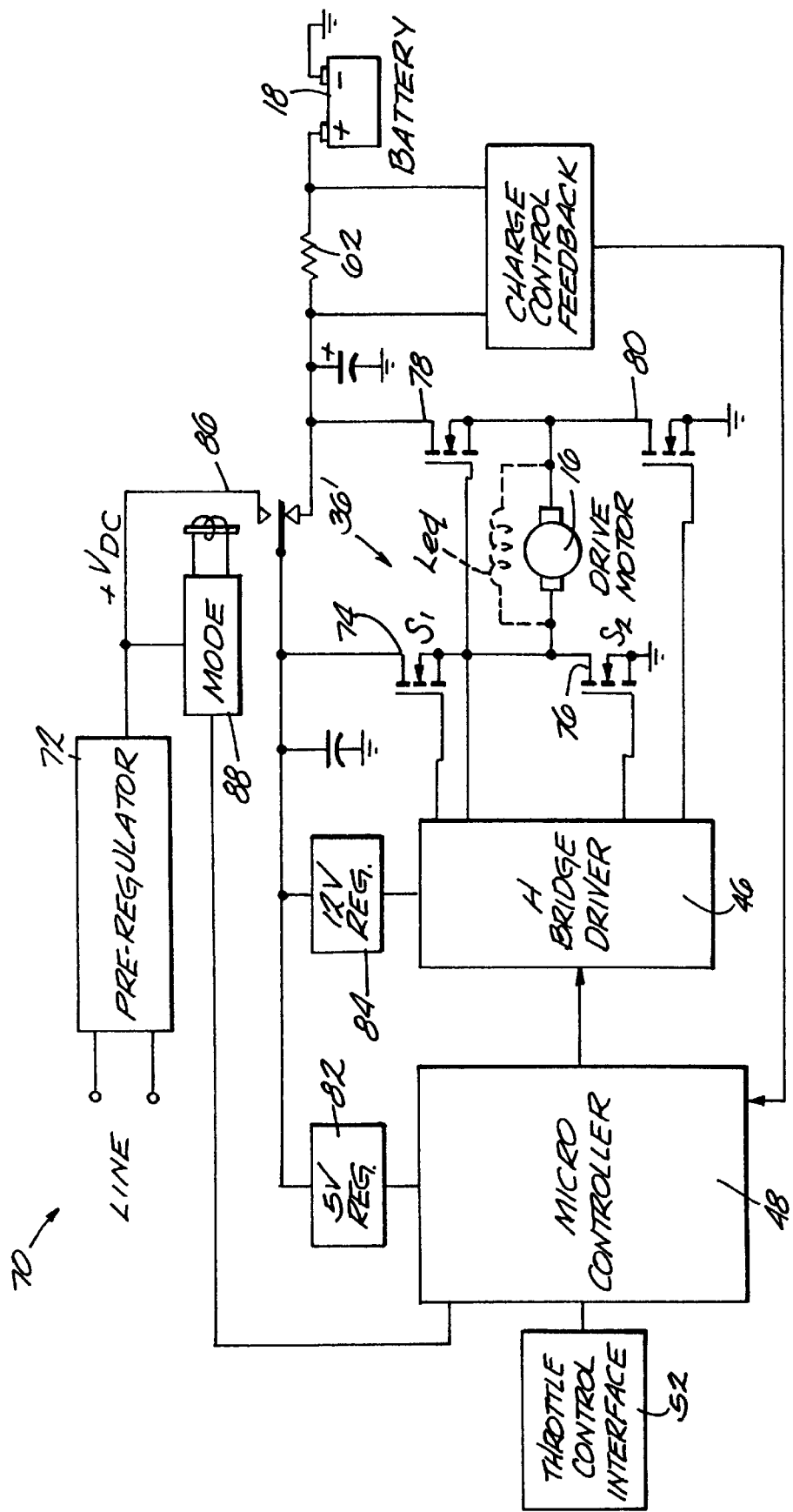
FIG. 6 is a simplified schematic diagram of a rechargeable, battery-operated motor drive constructed in accordance with various aspects of the invention and having a charging system making use of the inductance of the motor winding.

A motor drive/battery charge circuit 70 embodying various features of the invention is shown in FIG. 6. The circuit 70 includes an H bridge 36' having the same general configuration and operation of the H bridge 36 (FIG. 4) described previously. The H bridge 36' is coupled to the motor 16 and operates under the direction of the H bridge driver 46 and micro controller 48 to controllably apply power from the battery 18 to the motor 16.

Referring further to FIG. 6, the individual switching elements of the H-bridge 36' comprise power FETs 74, 76, 78 and 80. Energy for recharging the battery 18 is derived from the supply mains and is converted and processed by a pre-regulator circuit 72 into a direct current suitable for battery recharging. Regulator circuits 82, 84 of known construction and operation provide, respectively, +5 V regulated DC to operate the micro controller 48 and +12 V regulated DC to operate the switch devices of the bridge 36' and bridge driver 46.

A relay 86 under the control of a mode sensing circuit 88 functions to control whether the system is in an operational mode or a recharging mode. In the operational mode, FET 74 is coupled through the relay 86 to the battery. The H-bridge 36' thus functions to control the delivery of power from the battery 18 to the motor 16. In the recharge mode, FET 74 is coupled through the relay 86 to the output of the pre-regulator 72. Recharging energy provided at the output of the pre-regulator 72 is applied through components of the H-bridge 36' to the motor 16 which acts as inductor for storing recharging energy and then applying it to the battery 18. The mode sensing circuit 88 is coupled to the output of the pre-regulator 72 When the pre-regulator 72 is coupled to the supply mains to begin the recharging cycle, the mode sensing circuit senses the resulting output from the pre-regulator 72 and switches the relay 86 to the recharging mode.

In accordance with one aspect of the invention, the circuit 70 of FIG. 6 operates to recharge the battery 18 using the inductance $L_{eq}$ of the motor 16 rather than an additional inductance L1 (FIG. 5) as in prior systems. To this end, FET 74 functions as the first switch $S_1$ and couples the recharging current provided by the pre-regulator 72 to one terminal of the motor 16 rather than to an external or additional inductor L1 as in prior circuits. In the illustrated embodiment, the function of the second switch $S_2$ is realized by the parasitic diodes associated with FETs 76 and 78. Alternatively, discrete diodes can be used. Additionally, FETs 76 and 78 are turned ON when FET 74 is OFF to further reduce impedance in the discharge path. The control signal for controlling the first switch $S_1$ (i.e., FET 74) is developed within the micro controller 48.

In operation, battery charging is achieved by periodically turning the first switch $S_1$ (FET 74) ON and OFF. When switch $S_1$ is ON, charging current from the rectifier/filter 58 is applied through the switch $S_1$ to the motor 16. This has the effect of loading energy into the equivalent inductance $L_{eq}$ of the motor 16. When the switch $S_1$ is switched OFF, the energy stored in the inductance $L_{eq}$ discharges through switch $S_2$ (FETs 76 and 78) into the battery 18. This cycle repeats as the switch $S_1$ is alternately switched ON and OFF.

The rate at which charging energy is delivered to the battery 18 depends largely on the inductance of the motor winding $L_{eq}$ and the time period during which the winding $L_{eq}$ is coupled to the output of the pre-regulator 72. Because of the high voltages induced in the motor winding $L_{eq}$ as the current therein is introduced and interrupted, the charging rate is further limited by the ability of the FETs 74, 76, 78 and 80 to resist such voltages. The charging rate can be increased by selecting FETs having higher voltage ratings.

As recharging current is applied to the equivalent inductance $L_{eq}$ of the motor 16, it is desirable to keep the motor 16 from turning. This can be accomplished in several ways. First, a brake of known construction can be applied to the motor to keep it from turning as the recharging energy is applied. Preferably, the brake is engaged when the recharging cycle is initiated. Alternatively, the recharging pulses can be applied to the motor 16 at a sufficiently high rate that the inertia of the motor and drive system prevents it from turning as each recharging pulse is applied. Still another method is to reverse the direction of the recharging pulses applied to the motor 16 on alternate pulses. The average DC current through the motor is thus zero and the motor 16 remains stationary.

It will also be appreciated that the battery can be recharged in accordance with any desired recharging protocol by varying various of the recharging parameters. For example, the frequency of recharging pulses applied to the battery can be varied by controlling the frequency with which the first switch $S_1$ is switched ON and OFF, and the energy delivered to the battery 18 with each recharging pulse can be controlled by controlling how long the switch $S_1$ remains ON in relation to how long it remains OFF during each cycle. In some applications it is desirable to monitor the battery 18 for shorts during recharging to avoid directing the recharging current into a shorted or otherwise defective battery.

It will be appreciated that, although the system and method have been shown and described in the context of a battery-operated scooter, and although various specific circuits, voltage levels, operating frequencies etc. have been described, these are meant to be illustrative rather than limiting and the invention can be practiced in ways other than those explicitly described herein. Again, the invention can be practiced in other forms of devices, such as cordless tools, appliances etc., wherein a motor is operated using a rechargeable battery.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

We claim:

1. A method of charging a battery in a battery-powered, motorized system having a battery, a motor including a winding, and a drive circuit for controllably applying power from the battery to the motor, the method comprising the steps of:

providing a source of charging current;

switching the winding of the motor into electrical communication with the source of charging current through the drive circuit to store energy in the winding; and thereafter switching the winding of the motor into electrical communication with the battery through the drive circuit to discharge the energy stored in the winding into the battery, whereby the drive circuit and winding of the motor charge the battery.

2. A method as defined in claim 1 wherein the steps of switching the winding into electrical communication with the source of charging current and discharging the energy into the battery are alternately repeated.

3. A method as defined in claim 2 wherein the steps of switching the winding into electrical communication with the source of charging current and discharging the energy into the battery are alternately repeated at a predetermined cyclical rate.

4. A method as defined in claim 3 wherein the cyclical rate establishes alternating winding storage and winding discharge periods.

5. A method as defined in claim 4 wherein the step of switching the winding into electrical communication with the source of charging current takes place during a charge interval within the winding storage period.

6. A method as defined in claim 5 wherein the charge interval comprises less than the winding storage period.

7. A method as defined in claim 6 wherein the power delivered to recharge the battery is regulated through the further step of regulating the duration of each charge interval relative to the duration of the winding storage period in which it occurs.

8. A method as defined in claim 7 wherein the power delivered to recharge the battery is further regulated by means of adjusting the predetermined cyclical rate.

9. A method as defined in claim 1 wherein the winding is effectively isolated from the source of charging current when the winding is discharging energy into the battery.

10. A method as defined in claim 1 wherein the step of switching the motor winding into electrical communication with the source of charging current includes the step of biasing an electronic switch in the drive circuit into a conductive state.

11. A method as defined in claim 1 wherein the step of discharging the motor winding into the battery includes the step of forward biasing in the drive circuit a previously reverse biased diode.

12. A method as defined in claim 1 comprising the further step of controlling the amount of energy introduced into the winding by controlling the time during which the winding is switched into electrical communication with the source of charging current.

13. A method as defined in claim 1 comprising the further step of selecting the inductance of the motor winding at least in part through consideration of the desired rate at which the battery is to be charged.

14. A method as defined in claim 1 comprising the further step of avoiding actuation of the motor when the charging energy is introduced into the winding.

15. A method as defined in claim 14 further comprising the step of avoiding actuation of the motor by means of a brake.

16. A method as defined in claim 14 further comprising the step of avoiding actuation of the motor by means of switching the winding of the motor into electrical communication with the source of charging current at a cyclical rate above a predetermined threshold.

17. A method as defined in claim 14 further comprising the step of avoiding actuation of the motor by means of switching the winding of the motor into electrical communication with the source of charging current with alternating polarity.

18. A rechargeable battery-powered motor system comprising;
 a rechargeable battery;
 a motor having a winding;
 a motor drive circuit operable to apply electrical energy from the battery to the motor;
 an input circuit operable to receive charging current from an external source;
 a first electronic switch in the motor drive circuit operable to electrically connect and disconnect the input circuit with the winding of the motor; and
 a second electronic switch in the motor drive circuit operable to disconnect the winding of the motor from the battery when the first electronic switch connects the input circuit with the winding, and to connect the winding with the battery when the first electronic switch disconnects the input circuit from the winding so that energy is stored in the winding from the external source when the winding is connected with the input circuit and discharged into the battery when the winding is disconnected from the input circuit, whereby the winding and motor drive circuit charge the battery.

19. A motor system as defined in claim 18 wherein the first electronic switch is switchable between conductive and non-conductive states through application of an external control signal.

20. A motor system as defined in claim 19 wherein the second electronic switch is switchable between conductive and non-conductive states in accordance with the polarity of a voltage applied across the second electronic switch.

21. A motor system as defined in claim 20 wherein the first electronic switch comprises a semiconductor device.

22. A motor system as defined in claim 21 wherein the second electronic switch comprises a semiconductor device.

23. A motor system as defined in claim 22 wherein the first electronic switch comprises a transistor.

24. A motor system as defined in claim 23 wherein the second electronic switch comprises a diode or transistor.

25. A motor system as defined in claim 24 wherein the motor drive circuit comprises an H-bridge.

26. A motor system as defined in claim 24 further including a control circuit for developing the external control signal and applying the external control signal to the first electronic switch.

27. A motor system as defined in claim 18 further including means for avoiding actuation of the motor while the battery is being charged through the motor drive circuit.

28. A charging system for recharging a battery-operated motor drive unit having a rechargeable battery, a motor having a winding, and a motor drive circuit having first and second switches to apply electrical energy from the battery to the motor to operate the motor, the system comprising:
 an input for receiving externally supplied electrical energy; and
 a charging control circuit coupled to the input operable (i) to connect the winding with input through the first switch of the motor drive circuit to store electrical energy in the winding; (ii) to connect the winding with the battery to discharge the stored energy into the battery through the second switch of the motor drive circuit; and (iii) to actuate the first and second switches of the motor drive circuit to alternately store electrical energy in the winding and discharge electrical energy from the winding into the battery, whereby the winding of the motor and the motor drive circuit charge the battery.

29. A charging system as defined in claim 28 further including means for avoiding actuation of the motor while the battery is being charged through the motor drive circuit.

30. A method of charging a battery in a battery-powered, motorized system having a battery, a motor including a winding, and a drive circuit for controllably applying power from the battery to the motor, the method comprising the steps of:
 providing a source of charging current;
 switching the winding of the motor into electrical communication with the source of charging current to introduce energy into the winding;

thereafter discharging the energy from the winding into the battery; and avoiding actuation of the motor when the charging energy is introduced into the winding.

31. A method as defined in claim 30 further comprising the step of avoiding actuation of the motor by means of a brake.

32. A method as defined in claim 30 further comprising the step of avoiding actuation of the motor by means of switching the winding of the motor into electrical communication with the source of charging current at a cyclical rate above a predetermined threshold.

33. A method as defined in claim 30 further comprising the step of avoiding actuation of the motor by means of switching the winding of the motor into electrical communication with the source of charging current with alternating polarity.

34. A rechargeable battery-powered motor system comprising;

a rechargeable battery;

a motor having a winding;

a motor drive circuit comprising an H-bridge operable to apply electrical energy from the battery to the motor;

an input circuit operable to receive charging current from an external source;

a first electronic switch comprising a transistor, which forms a part of the H-bridge, switchable between conductive and non-conductive states through application of an external control signal to electrically connect and disconnect the input circuit with the winding of the motor; and a second electronic switch comprises a diode or transistor a diode or transistor, which forms a part of the H-bridge, switchable between conductive and non-conductive states in accordance with the polarity of a voltage applied across the second electronic switch to disconnect the winding of the motor from the battery when the first electronic switch connects the input circuit with the winding, and to connect the winding with the battery when the first electronic switch disconnects the input circuit from the winding so that energy introduced into the winding from the external source when the winding is connected with the input circuit is discharged into the battery when the winding is disconnected from the input circuit, whereby the battery is charged through the winding and the motor drive circuit.

35. A motor system as defined in claim 34 further including a control circuit for developing the external control signal and applying the external control signal to the first electronic switch.

36. A motor system as defined in claim 34 further including means for avoiding actuation of the motor while the battery is being charged through the motor drive circuit.

37. A rechargeable battery-powered motor system comprising:

a rechargeable battery;

a motor having a winding coupled to the battery;

a motor drive circuit comprising an H-bridge operable to apply electrical energy from the battery to the motor;

an input circuit operable to receive charging current from an external source; and an electronic switch comprising a transistor, which forms a part of the H-bridge, switchable between conductive and non-conductive states through application of an external control signal to electrically connect and disconnect the input circuit with the winding of the motor so that energy introduced into the winding from the external source when the winding is connected with the input circuit is discharged into the battery when the winding is disconnected from the input circuit, whereby the battery is charged through the winding and the motor drive circuit.

38. A motor system as defined in claim 37 further including a control circuit for developing the external control signal and applying the external control signal to the electronic switch.

39. A motor system as defined in claim 37 further including means for avoiding actuation of the motor while the battery is being charged through the motor drive circuit.

40. A rechargeable battery-powered motor system comprising:

a rechargeable battery;

a motor having a winding coupled to the battery;

an input circuit operable to receive charging current from an external source a motor drive circuit comprising switches operable in response to control signals in a drive mode to apply electrical energy from the battery to the motor, to thereby operate the motor, and in a charge mode to electrically connect and disconnect the input circuit with the winding of the motor so that energy is stored in the winding from the external source when the winding is connected with the input circuit and discharged into the battery when the winding is disconnected from the input circuit, whereby the winding and the motor drive system charge the battery.

41. A motor system as defined in claim 40 wherein the switches are part of an H-bridge.

42. A motor system as defined in claim 40 further including means for avoiding actuation of the motor during the charge mode.

43. A motor system as defined in claim 40 wherein switches include a first electronic switch switchable between conductive and non-conductive states through application of an external control signal.

44. A motor system as defined in claim 43 wherein the first electronic switch comprises a transistor.

45. A motor system as defined in claim 40 wherein the switches include a second electronic switch is switchable between conductive and non-conductive states in accordance with the polarity of a voltage applied across the second electronic switch.

46. A motor system as defined in claim 45 wherein the second electronic switch comprises a diode or transistor.

47. A motor system as defined in claim 40 wherein the switches comprise semiconductor devices.

48. A motor system as defined in claim 40 further including a control circuit for developing the control signals and applying the control signal to the switches.

* * * * *